(12) United States Patent
Park

(10) Patent No.: US 10,747,388 B2
(45) Date of Patent: Aug. 18, 2020

(54) ELECTRONIC DEVICE AND CONTROL METHOD THEREFOR

(71) Applicant: SAMSUNG ELECTRONICS CO., LTD., Suwon-si, Gyeonggi-do (KR)

(72) Inventor: Eun-Chan Park, Seoul (KR)

(73) Assignee: SAMSUNG ELECTRONICS CO., LTD., Suwon-si, Gyeonggi-do (KR)

(*) Notice: Subject to any disclaimer, the term of this patent is extended or adjusted under 35 U.S.C. 154(b) by 0 days.

(21) Appl. No.: 16/085,247

(22) PCT Filed: Nov. 22, 2016

(86) PCT No.: PCT/KR2016/013454
§ 371 (c)(1),
(2) Date: Sep. 14, 2018

(87) PCT Pub. No.: WO2017/159961
PCT Pub. Date: Sep. 21, 2017

(65) Prior Publication Data
US 2019/0079655 A1 Mar. 14, 2019

(30) Foreign Application Priority Data
Mar. 14, 2016 (KR) .................. 10-2016-0030468

(51) Int. Cl.
*G06F 3/0481* (2013.01)
*G06F 3/0362* (2013.01)
(Continued)

(52) U.S. Cl.
CPC .......... *G06F 3/04812* (2013.01); *G06F 1/163* (2013.01); *G06F 3/018* (2013.01); *G06F 3/0362* (2013.01); *G06F 3/03545* (2013.01); *G06F 3/0481* (2013.01); *G06F 3/0482* (2013.01); *G06F 3/0488* (2013.01);
(Continued)

(58) Field of Classification Search
CPC ................................................... G06F 3/04883
See application file for complete search history.

(56) References Cited

U.S. PATENT DOCUMENTS 6,462,733 B1* 10/2002 Murakami .............. G06F 3/033
345/156
2006/0210163 A1 9/2006 Garside et al.
(Continued)

FOREIGN PATENT DOCUMENTS

KR 10-2010-0131606 12/2010
KR 10-2013-0092934 8/2013
(Continued)

OTHER PUBLICATIONS

International Search Report for PCT/KR2016/013454 dated Feb. 16, 2017, 4 pages.
(Continued)

*Primary Examiner* — Robin J Mishler
(74) *Attorney, Agent, or Firm* — Nixon & Vanderhye, P.C.

(57) ABSTRACT

An example electronic device includes a touch screen and a processor configured to display a stroke on the touch screen corresponding to a gesture inputted to the touch screen and delete at least a portion of the displayed stroke from a first point of the stroke according to a delete input inputted through an external device.

14 Claims, 19 Drawing Sheets

(51) Int. Cl.
*G06F 3/01* (2006.01)
*G06F 1/16* (2006.01)
*G06F 3/0354* (2013.01)
*H04M 1/725* (2006.01)
*G06F 3/0488* (2013.01)
*G06T 11/20* (2006.01)
*G06F 3/0482* (2013.01)

(52) U.S. Cl.
CPC ...... *G06F 3/04817* (2013.01); *G06F 3/04883* (2013.01); *G06T 11/203* (2013.01); *H04M 1/725* (2013.01); *H04M 1/72522* (2013.01); *G06F 2203/0381* (2013.01); *H04M 1/7253* (2013.01); *H04M 2250/22* (2013.01)

(56) References Cited

U.S. PATENT DOCUMENTS

| | | | | |
|---|---|---|---|---|
| 2010/0050188 | A1* | 2/2010 | Schellingerhout | G06F 9/451 719/318 |
| 2010/0313158 | A1* | 12/2010 | Lee | G06F 3/04845 715/769 |
| 2014/0149907 | A1 | 5/2014 | Kim et al. | |
| 2014/0157119 | A1 | 6/2014 | Lim | |
| 2014/0253522 | A1* | 9/2014 | Cueto | G06F 3/03545 345/179 |
| 2014/0359528 | A1* | 12/2014 | Murata | G06F 3/0488 715/833 |
| 2015/0089369 | A1 | 3/2015 | Ahn | |
| 2015/0286302 | A1 | 10/2015 | Kim | |
| 2016/0005205 | A1 | 1/2016 | Liang et al. | |

FOREIGN PATENT DOCUMENTS

| | | |
|---|---|---|
| KR | 10-2013-0115061 | 10/2013 |
| KR | 10-2014-0063971 | 5/2014 |
| KR | 10-2014-0068595 | 6/2014 |
| KR | 10-2014-0069869 | 6/2014 |

OTHER PUBLICATIONS

Written Opinion of the ISA for PCT/KR2016/013454 dated Feb. 16, 2017, 5 pages.

* cited by examiner

ELECTRONIC DEVICE AND CONTROL METHOD THEREFOR

CROSS-REFERENCE TO RELATED APPLICATION(S)

This application is a National Phase Entry of PCT International Application No. PCT/KR2016/013454, which was filed on Nov. 22, 2016, and claims priority to Korean Patent Application No. 10-2016-0030468, which was filed on Mar. 14, 2016, the contents of which are incorporated herein by reference.

BACKGROUND

1. Field

Various embodiments of the present disclosure relate to an electronic device and a method for controlling the same, for example, a method for modifying an image displayed on a touch screen of an electronic device.

2. Description of the Related Art

Recently, techniques have been introduced to receive writing or drawing inputs through a touch screen included in an electronic device (e.g., a smart phone, a smart watch, a tablet personal computer (PC), etc.) and to display the writing or the drawing through the touch screen based on the received input.

In particular, a user may delete the displayed writing or drawing through a deletion key (e.g., a backspace, a delete key, etc.) of a keyboard, or select a tool menu (e.g., an eraser menu) for deleting the writing or drawing and then remove the region to be deleted as if rubbing it with an eraser.

When using a conventional electronic device, the user may erase a part of a region of an image that includes the displayed writing or drawing at a time.

SUMMARY

As stated above, when a user desires to delete writing or a drawing displayed on a touch screen, the user has to select a separate menu for deleting the writing or the drawing and has to delete a partial region of an image by using a tool corresponding to the menu.

Thus, problematically, the user inevitably deletes not only the stroke to be erased, but also the partial region including the stroke.

Various embodiments of the present disclosure are made to solve the foregoing or other problems, and provide an electronic device that allows a user to designate and delete the stroke to be deleted.

According to various embodiments of the present disclosure, an electronic device may include a touch screen on which a stroke is displayed corresponding to a gesture input to the touch screen, and a processor, in which the processor is configured to delete at least a part of the displayed stroke from a first point of the stroke based on a delete input inputted through an external device.

According to various embodiments of the present disclosure, a user may designate writing or a drawing to be deleted and freely delete only the designated writing or drawing.

Moreover, according to various embodiments of the present disclosure, the user may delete only a part to be deleted from a stroke to be deleted in a displayed image region.

DETAILED DESCRIPTION

Figure 1:
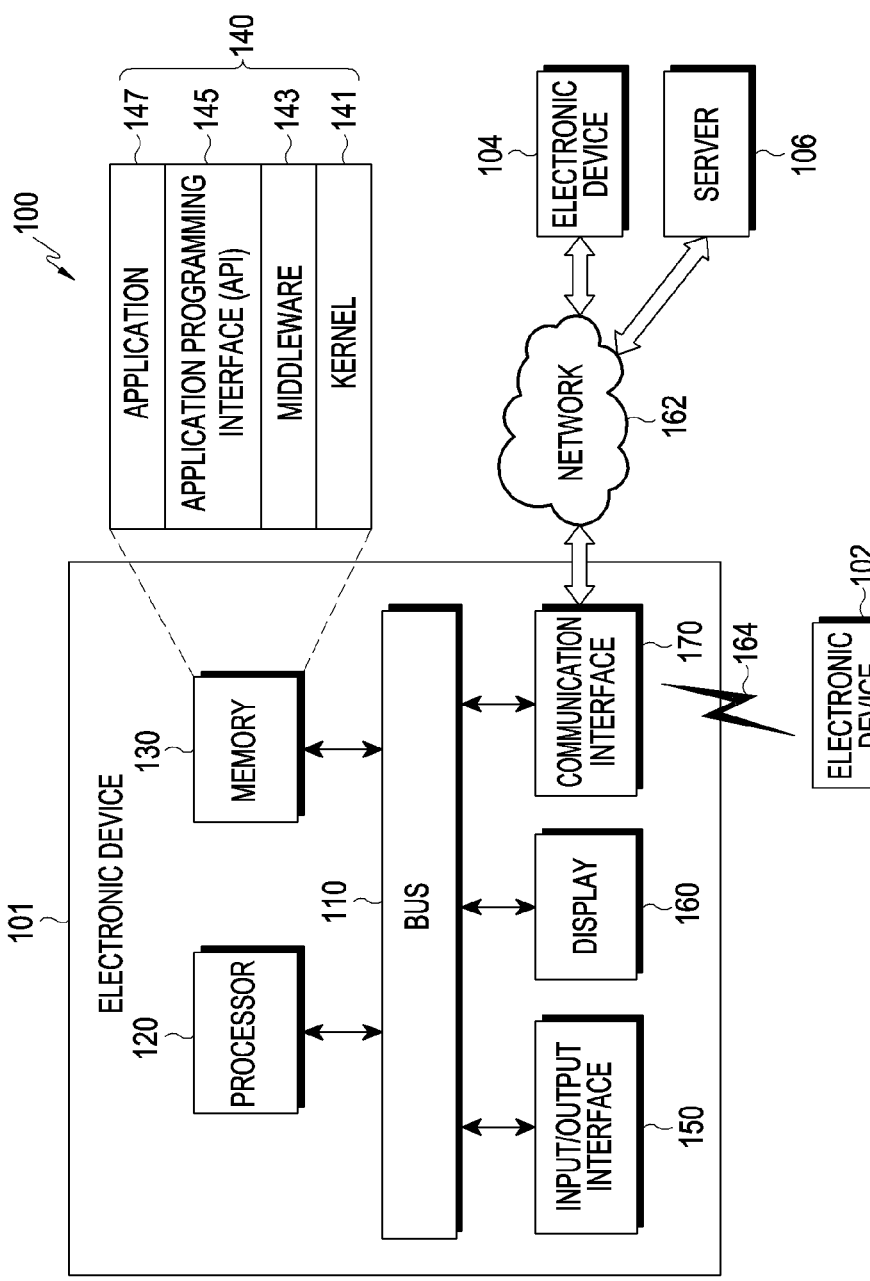
FIG. 1 is a block diagram of an electronic device and a network according to various embodiments of the present disclosure.

Hereinafter, various embodiments of the present disclosure will be disclosed with reference to the accompanying drawings. However, embodiments and terms used therein are not intended to limit the present disclosure to particular embodiments, and it should be construed as including various modifications, equivalents, and/or alternatives according to the embodiments of the present disclosure. With regard to the description of the drawings, similar reference numerals may be used to refer to similar or related elements. It is to be understood that a singular form of a noun corresponding to an item may include one or more of the things, unless the relevant context clearly indicates otherwise. In the present disclosure, an expression such as "A or B," "at least one of A or/and B," or "one or more of A or/and B" may include all possible combinations of together listed items. Expressions such as "first," "second," "primarily," or "secondary," used herein may represent various elements regardless of order and/or importance and do not limit corresponding elements. When it is described that an element (such as a first element) is "operatively or communicatively coupled with/to" or "connected" to another element (such as a second element), the element can be directly connected to the other element or can be connected to the other element through another element (e.g., a third element).

An expression "configured to (or set)" used in the present disclosure may be replaced with, for example, "suitable for," "having the capacity to," "adapted to," "made to," "capable of," or "designed to" according to a situation. Alternatively, in some situation, an expression "apparatus configured to" may mean that the apparatus "can" operate together with another apparatus or component. For example, a phrase "a processor configured (or set) to perform A, B, and C" may be a dedicated processor (e.g., an embedded processor) for performing a corresponding operation or a generic-purpose processor (such as a central processing unit (CPU) or an application processor) that can perform a corresponding operation by executing at least one software program stored at a memory device.

An electronic device according to various embodiments of the present disclosure may include at least one of, for example, a smartphone, a tablet personal computer (PC), a mobile phone, a video phone, an electronic-book (e-book) reader, a desktop PC, a laptop PC, a netbook computer, a workstation, a server, a personal digital assistant (PDA), a portable multimedia player (PMP), an MP3 player, a mobile medical equipment, a camera, and a wearable device. Examples of the wearable device may include at least one of an accessory type (e.g., a watch, a ring, a bracelet, an anklet, a necklace, glasses, contact lenses, head-mounted device (HMD), etc.), a fabric or cloth-integrated type (e.g., electronic clothing, etc.), a body-attached type (e.g., a skin pad, a tattoo, etc.), a body implanted type (e.g., an implantable circuit, etc.), and so forth. In some embodiments, the electronic device may include, for example, a television (TV), a digital video disk (DVD) player, audio equipment, a refrigerator, an air conditioner, a vacuum cleaner, an oven, a microwave oven, a laundry machine, an air cleaner, a set-top box, a home automation control panel, a security control panel, a TV box (e.g., Samsung HomeSync™, Apple TV™, or Google TV™), a gaming console (e.g., Xbox™, PlayStation™), an electronic dictionary, an electronic key, a camcorder, and an electronic frame.

In other embodiments, the electronic device may include at least one of various medical equipment (for example, magnetic resonance angiography (MRA), magnetic resonance imaging (MRI), computed tomography (CT), an imaging device, or an ultrasonic device), a navigation system, a global positioning system (GPS) receiver, an event data recorder (EDR), a flight data recorder (FDR), a vehicle infotainment device, electronic equipment for ships (e.g., a navigation system and gyro compass for ships), avionics, a security device, a vehicle head unit, an industrial or home robot, an automatic teller's machine (ATM), a point of sales (POS), Internet of things (e.g., electric bulbs, various sensors, electricity or gas meters, sprinkler devices, fire alarm devices, thermostats, streetlights, toasters, exercise machines, hot-water tanks, heaters, boilers, and so forth). According to some embodiments, the electronic device may include a part of a furniture, building/structure or a part of a vehicle, an electronic board, an electronic signature receiving device, a projector, and various measuring instruments (e.g., a water, electricity, gas, electric wave measuring device, etc.). According to various embodiments, the electronic device may be flexible or may be a combination of two or more of the above-described various devices. According to an embodiment of the disclosure, the electronic devices are not limited to those described above. Herein, the term "user" used in various embodiments of the present disclosure may refer to a person who uses the electronic device or a device using the electronic device.

Referring to FIG. 1, an electronic device 101 in a network environment 100 according to various embodiments of the present disclosure is disclosed. The electronic device 101 may include a bus 110, a processor 120, a memory 130, an input/output (I/O) interface 150, a display 160, and a communication interface 170. According to some embodiments, the electronic device 101 may omit at least one of the foregoing elements or may further include other elements. The bus 110 may include a circuit for connecting, e.g., the elements 110 to 170 and delivering communication (e.g., a control message or data) between the elements 110 to 170. The processor 120 may include one or more of a central processing unit (CPU), an application processor (AP), and a communication processor (CP). The processor 120 performs operations or data processing for control and/or communication of, for example, at least one other elements of the electronic device 101.

The memory 130 may include a volatile and/or nonvolatile memory. The memory 130 may store, for example, instructions or data associated with at least one other elements of the electronic device 101. According to an embodiment of the present disclosure, the memory 130 may store software and/or a program 140. The program 140 may include at least one of, for example, a kernel 141, middleware 143, an application programming interface (API) 145, and/or an application program (or "application") 147, and the like. At least some of the kernel 141, the middleware 143, and the API 145 may be referred to as an operating system (OS). The kernel 141 may control or manage, for example, system resources (e.g., the bus 110, the processor 120, the memory 130, etc.) used to execute operations or functions implemented in other programs (e.g., the middleware 143, the API 145, or the application program 147). The kernel 141 provides an interface through which the middleware 143, the API 145, or the application program 147 accesses separate components of the electronic device 101 to control or manage the system resources.

The middleware 143 may work as an intermediary for allowing, for example, the API 145 or the application program 147 to exchange data in communication with the kernel 141. In addition, the middleware 143 may process one or more task requests received from the application program 147 based on priorities. For example, the middleware 143 may give a priority for using a system resource (e.g., the bus 110, the processor 120, the memory 130, etc.) of the electronic device 101 to at least one of the application programs 147, and may process the one or more task requests. The API 145 is an interface used for the application 147 to control a function provided by the kernel 141 or the middleware 143, and may include, for example, at least one interface or function (e.g., an instruction) for file control, window control, image processing or character control. The I/O interface 150 may deliver, for example, an instruction or data input from a user or another external device to other component(s) of the electronic device 101, or output an instruction or data received from other component(s) of the electronic device 101 to a user or another external device.

The display 160 may include, for example, a liquid crystal display (LCD), a light emitting diode (LED) display, an organic light emitting diode (OLED) display, a microelectromechanical system (MEMS) display, or an electronic paper display. The display 160 may, for example, display various contents (e.g., a text, an image, video, an icon, and/or a symbol, etc.) to users. The display 160 may include a touch screen, and receives a touch, a gesture, proximity, or a hovering input, for example, by using an electronic pen or a part of a body of a user. The communication interface 170 establishes communication between the electronic device 101 and an external device (e.g., a first external electronic device 102, a second external electronic device 104, or a server 106). For example, the communication interface 170 may be connected to a network 162 through wireless communication 164 or wired communication to communicate with an external device (e.g., the second external electronic device 104 or the server 106).

The wireless communication may include cellular communication using at least one of Long Term Evolution (LTE), LTE-Advanced (LTE-A), Code Division Multiple Access (CDMA), Wideband CDMA (WCDMA), a Universal Mobile Telecommunication System (UMTS), Wireless Broadband (WiBro), or Global System for Mobile Communications (GSM)). According to an embodiment, the wireless communication may include at least one of Wireless Fidelity (WiFi), Bluetooth, Bluetooth Low Energy (BLE), Zigbee, near field communication (NFC), magnetic secure transmission (MST), radio frequency (RF), and body area network (BAN). According to an embodiment, the wireless communication may include global navigation satellite system (GNSS). The GNSS may include, for example, at least one of a global positioning system (GPS), a global navigation satellite system (Glonass), a Beidou navigation satellite system ("Beidou"), and Galileo, the European global satellite-based navigation system. Hereinbelow, "GPS" may be used interchangeably with "GNSS". The wired communication may include, for example, at least one of universal serial bus (USB), high definition multimedia interface (HDMI), recommended standard 232 (RS-232), power line communication, and plain old telephone service (POTS). The network 162 may include a telecommunications network, for example, at least one of a computer network (e.g., a local area network (LAN) or a wide area network (WAN)), Internet, and a telephone network.

Each of the first external electronic device 102 and the second external electronic device 104 may be a device of the same type as or a different type than the electronic device 101. According to various embodiments of the present disclosure, some or all of operations performed by the electronic device 101 may be performed in another electronic device or a plurality of electronic devices (e.g., the electronic device 102 or 104, or the server 106). According to an embodiment of the present disclosure, when the electronic device 101 has to perform a function or a service automatically or at a request, the electronic device 101 may request another device (e.g., the electronic devices 102 or 104 or the server 106) to perform at least some functions associated with the function or the service instead of or in addition to executing the function or the service. The another electronic device (e.g., the electronic device 102 or 104 or the server 106) may execute the requested function or additional function and deliver the execution result to the electronic device 101. The electronic device 101 may then process or further process the received result to provide the requested function or service. To that end, a cloud computing, distributed computing, or client-server computing technology may be used, for example.

Referring to FIGS. 2 to 19, a description will be made for a method for controlling an electronic device according to various embodiments of the present disclosure.

Figure 2:
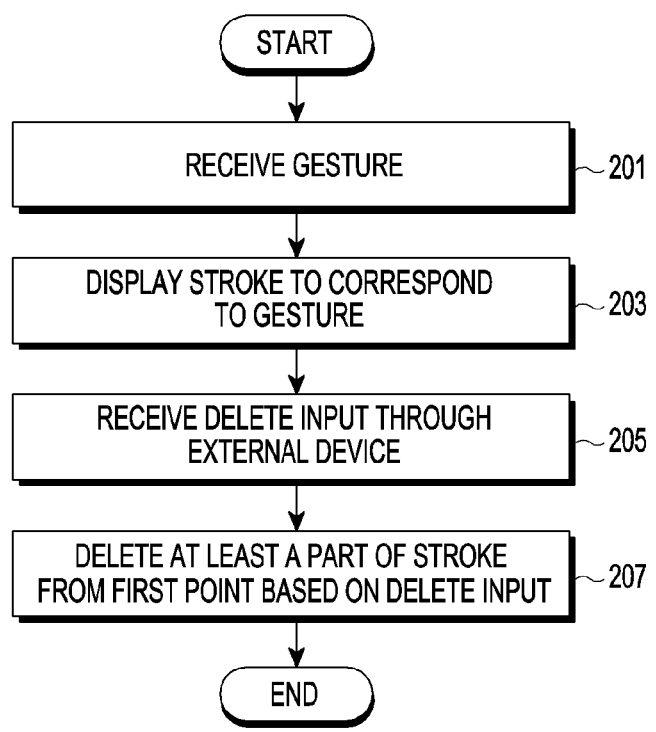
FIG. 2 is a flowchart illustrating a method for controlling an electronic device according to various embodiments of the present disclosure.

FIG. 2 is a flowchart illustrating a method for controlling an electronic device according to various embodiments of the present disclosure.

As shown in FIG. 2, according to various embodiments, in operation 201, an electronic device (e.g., the electronic device 101) may receive a gesture from an input device through a touch screen.

According to various embodiments, the electronic device 101 may receive a gesture from an input device, e.g., an electronic pen or a user's finger, through a touch screen, in operation 201.

According to various embodiments, in operation 203, a processor (e.g., the processor 120) of the electronic device 101 may display a continuous stroke through the touch screen to correspond to the gesture input through the touch screen.

According to various embodiments, the processor 120 may display the continuous stroke through the touch screen based on an input sequence of the gesture to correspond to the gesture input through the touch screen.

According to various embodiments, the processor 120 may display the continuous stroke from a first point that is the input start point of the gesture to a second point that is the input endpoint of the gesture through the touch screen to correspond to the gesture input through the touch screen.

According to various embodiments, the processor 120 may display writing or a drawing including at least one continuous stroke from the input start point of the gesture to the input end point of the gesture through the touch screen to correspond to the gesture input through the touch screen.

According to various embodiments, in operation 205, the electronic device 101 may receive a delete input inputted through an external device outside of the electronic device 101.

According to various embodiments, the external device outside the electronic device 101 may include an electronic device (e.g., the electronic device 102 or 104). For example, the external device outside the electronic device 101 may include a mobile terminal. For example, the external device may include a smart phone, a smart watch, or a tablet PC.

According to various embodiments, the delete input may include a gesture inputted through the external device, a touch input inputted through the external device, a rotation inputted through some of components of the external device (e.g., a rotation input unit of a smart watch), pressure inputted through some of the components, or a gesture with respect to a cover that covers the electronic device 101.

According to various embodiments, in operation 207, the processor 120 of the electronic device 101 may delete at least a part of the stroke from the first point of the stroke displayed on the touch screen based on the delete input received from the external device (e.g., the electronic device 102 or 104).

According to various embodiments, the processor 120 may move a cursor displayed in the first point of the stroke displayed on the touch screen to a particular point of the stroke based on the direction and/or size of the delete input. According to various embodiments, the processor 120 may move the cursor displayed in the first point of the stroke displayed on the touch screen to the second point of the stroke and then delete a part of the stroke from the first point, which is the position of the cursor, to the second point of the stroke to correspond to a second delete input (e.g., an input pressing the rotation input unit), based on the direction and/or size of a first delete input (e.g., counterclockwise 30-degree rotation of the rotation input unit of the smart watch). According to various embodiments, the processor 120 may move the cursor displayed in the first point of the stroke displayed on the touch screen to the second point of the stroke and then delete a part of the stroke from the first point, which is the position of the cursor, to a third point to which the cursor is to be moved to correspond to a third delete input (e.g., an input pressing and rotating the rotation input unit), based on the direction and/or size of the first delete input (e.g., counterclockwise 30-degree rotation of the rotation input unit of the smart watch).

Figure 3:
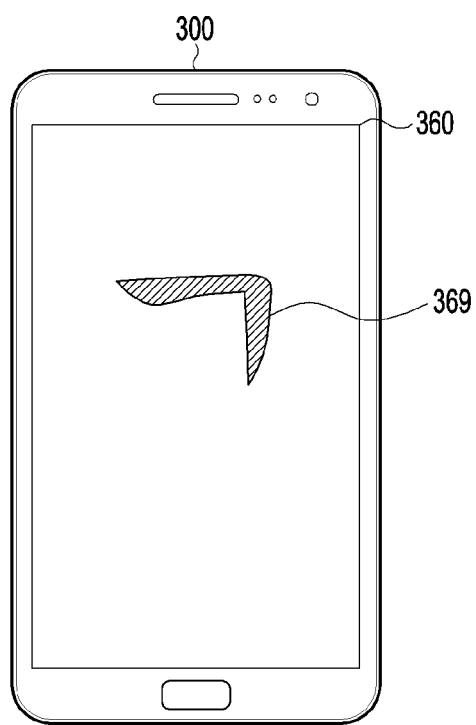
FIG. 3 illustrates an electronic device and a touch screen included in the electronic device according to various embodiments of the present disclosure.

FIG. 3 illustrates an electronic device and a touch screen included in the electronic device according to various embodiments of the present disclosure.

As illustrated in FIG. 3, according to various embodiments, an electronic device 300 may be a smart phone, and may include a touch screen 360.

According to various embodiments, the touch screen 360 may receive a gesture and display a stroke 369 in response to the received gesture.

According to various embodiments, the touch screen 360 may display at least one writing, drawing, or image including writing or a drawing, which includes the stroke 369 corresponding to the received gesture.

Figure 4:
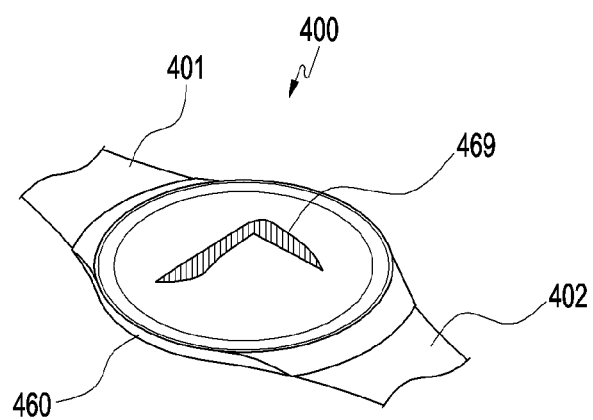
FIG. 4 illustrates an electronic device and a touch screen included in the electronic device according to various embodiments of the present disclosure.

FIG. 4 illustrates an electronic device and a touch screen included in the electronic device according to various embodiments of the present disclosure.

As illustrated in FIG. 4, according to various embodiments, an electronic device 400 may be a smart watch, and may include a touch screen 460 and watch straps 401 and 402 provided on opposite sides of the touch screen 460.

According to various embodiments, the touch screen 460 may display at least one writing and/or drawing including the stroke 469 corresponding to the received gesture. According to various embodiments, the touch screen 460 may display an image including at least one writing or drawing, which includes the stroke 469 corresponding to the received gesture.

Figure 5:
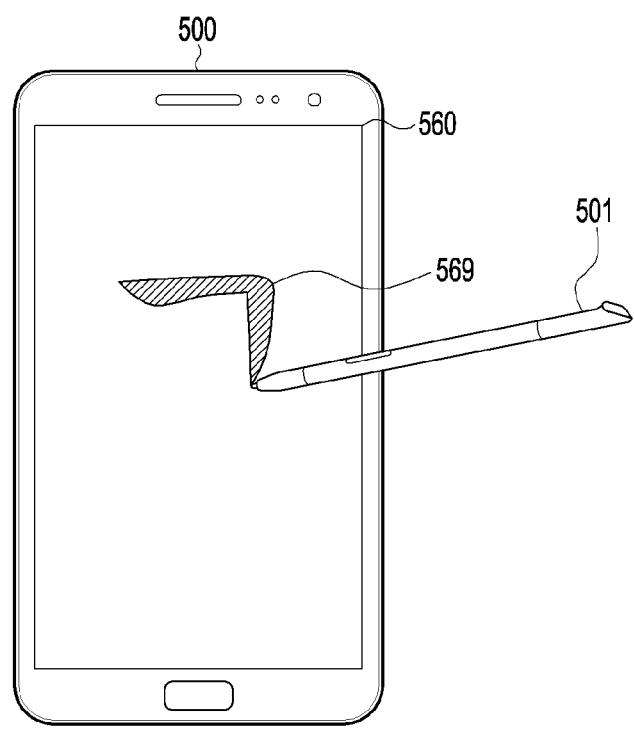
FIG. 5 shows a gesture inputting method according to various embodiments of the present disclosure.

FIG. 5 shows a gesture inputting method according to various embodiments of the present disclosure.

As shown in FIG. 5, according to various embodiments, an input device 501 may include an electronic pen.

According to various embodiments, once a user inputs a gesture to a touch screen 560 of an electronic device 500 through an input device 501, a processor (e.g., the processor 120) of the electronic device 500 may display a stroke 569 based on the gesture through the touch screen 560 to correspond to the input gesture.

Figure 6:
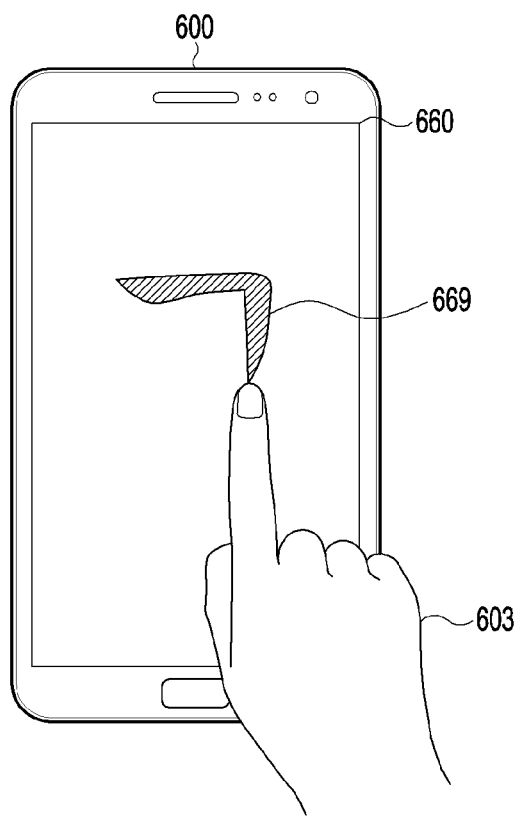
FIG. 6 shows a gesture inputting method according to various embodiments of the present disclosure.

FIG. 6 shows a gesture inputting method according to various embodiments of the present disclosure.

As shown in FIG. 6, according to various embodiments, the processor (e.g., the processor 120) of an electronic device 600 may receive a gesture inputted by a user's finger 603 through a touch screen 660. According to various embodiments, the processor 120 may display at least one stroke 669 through the touch screen 660 to correspond to the received gesture inputted by the user's finger 603.

Figure 7:
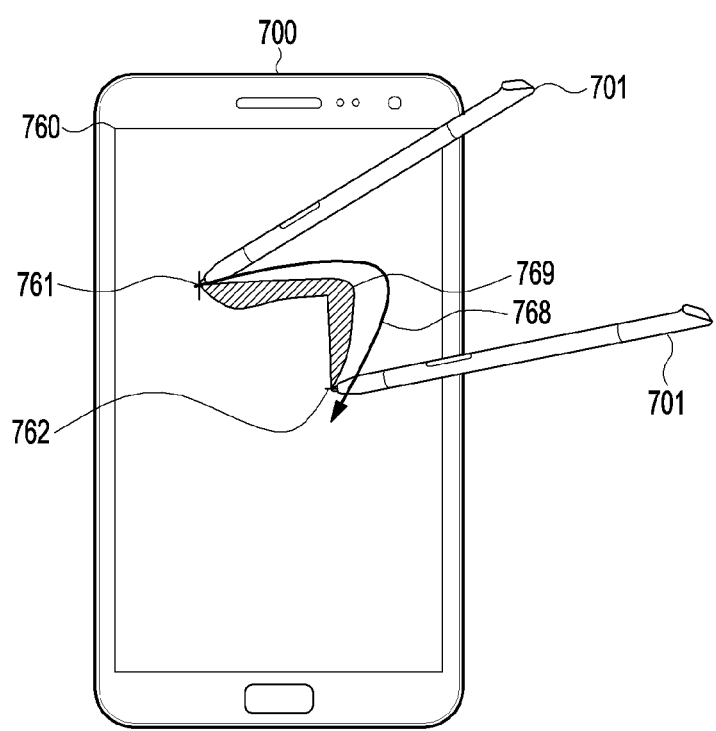
FIG. 7 shows a stroke displaying method according to various embodiments of the present disclosure.

FIG. 7 shows a stroke displaying method according to various embodiments of the present disclosure.

As shown in FIG. 7, according to various embodiments, the processor (e.g., the processor 120) of an electronic device 700 may receive a gesture inputted by an electronic pen 701 through a touch screen 760.

According to various embodiments, the processor 120 may receive the gesture in a first direction 768 inputted by the electronic pen 701 through the touch screen 760, and display at least one stroke 769 through the touch screen 760 to correspond to the gesture in the first direction 768.

According to various embodiments, the processor 120 may display the stroke 769 that is continuous from an input start point of the gesture, i.e., a first point 761, to an input end point of the gesture, i.e., a second point 762, through the touch screen 760 to correspond to the gesture in the first direction 768, which starts from the first point 761 of the touch screen 760 and ends at the second point 762 of the touch screen 760.

Figure 8:
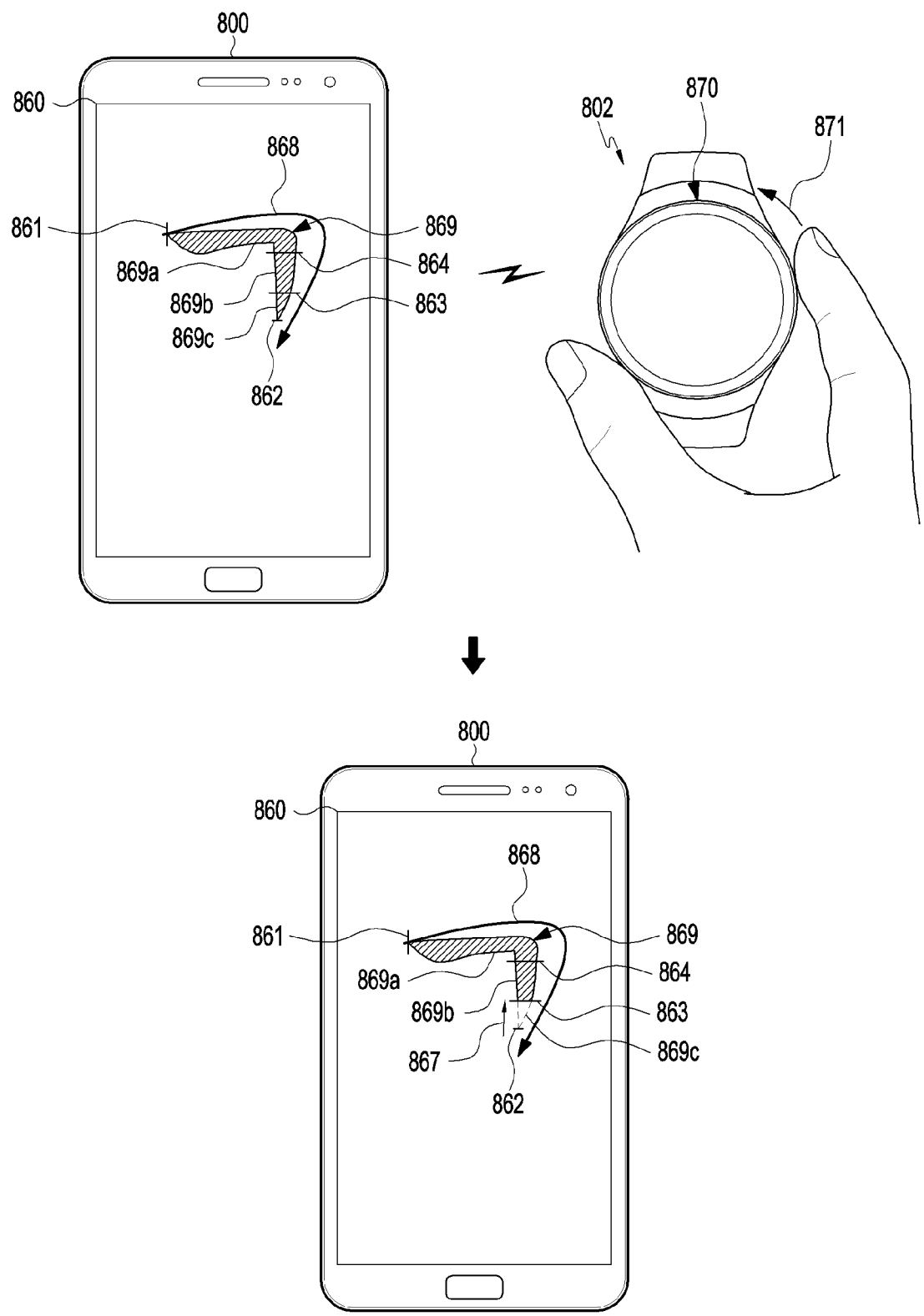
FIG. 8 shows a stroke deleting method according to various embodiments of the present disclosure.

FIG. 8 shows a stroke deleting method according to various embodiments of the present disclosure.

As shown in FIG. 8, according to various embodiments, the processor 120 of the electronic device 800 may receive a gesture inputted in a first direction 868 from a first point 861 to a second point 862 via a fourth point 864 and then a third point 863 on a touch screen 860.

According to various embodiments, the processor 120 may display a stroke 869 that is continuous from the first point 861 to the second point 862, through the touch screen 860 to correspond to the gesture inputted in the first direction 868 from the first point 861 to the second point 862.

According to various embodiments, the processor 120 may display a first stroke region 869a that is continuous from the first point 861 to the fourth point 864, a second stroke region 869b that is continuous from the fourth point 864 to the third point 863, and a third stroke region 869c that is continuous from the third point 863 to the second point 862 through the touch screen 860 to correspond to the gesture inputted in the first direction 868 from the first point 861 to the second point 862 via the fourth point 864 and then the third point 863 on the touch screen 860.

According to various embodiments, when displaying the stroke 869 that is continuous from the first point 861 to the second point 862 to correspond to the gesture inputted through the touch screen 860, the processor 120 may receive a delete input of a first size in a counterclockwise direction 871 inputted through a rotation input unit 870 of an external device 802 capable of communicating with the electronic device 800, and delete at least a part of the stroke 869 displayed on the touch screen 860 based on the first-size delete input in a counterclockwise direction 871.

For example, the processor 120 may delete at least a part (e.g., the third stroke region) 869c of the stroke 869 from the second point 862 of the stroke 869 displayed on the touch screen 860 based on the delete input inputted and received through the external device 802.

The processor 120 may sequentially delete the at least a part of the stroke 869, the third stroke region 869c, from the second point 862 of the stroke 869 in a second direction 867 that is opposite to the first direction 868 in which the stroke 869 is input, based on the first-size delete input in a counterclockwise direction 871.

Figure 9:
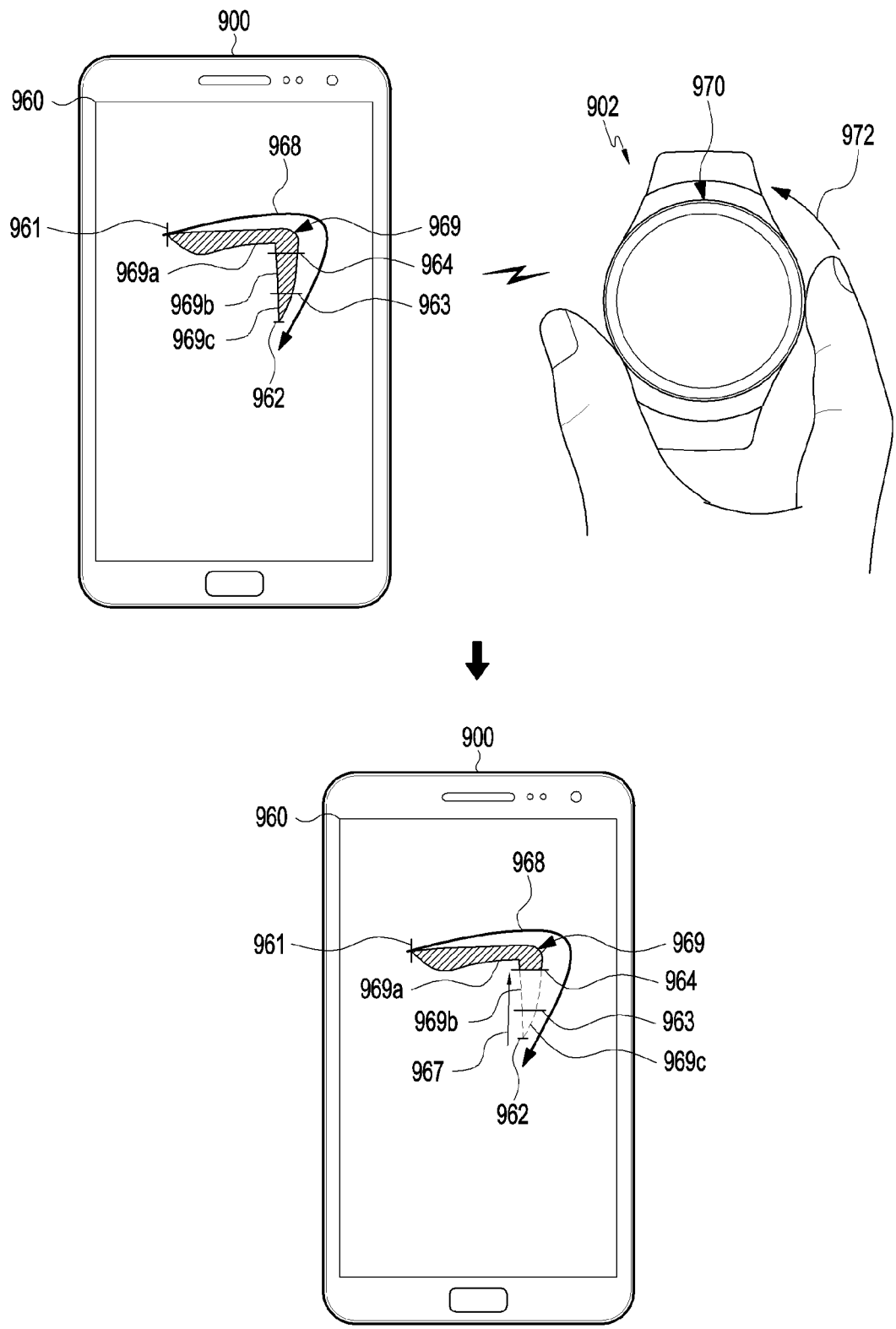
FIG. 9 shows a stroke deleting method according to various embodiments of the present disclosure.

FIG. 9 shows a stroke deleting method according to various embodiments of the present disclosure.

As shown in FIG. 9, according to various embodiments, a processor (e.g., the processor 120) of an electronic device 900 may receive a gesture inputted in a first direction 968 from a first point 961 to a second point 962 through a touch screen 960.

According to various embodiments, the processor 120 may receive the gesture inputted in the first direction 968 from the first point 961 to the second point 962 via a fourth point 964 and then a third point 963, and display a stroke 969 that is continuous from the first point 961 to the second point 962 through the touch screen 960 to correspond to the received gesture.

According to various embodiments, the processor 120 may display a first stroke region 969a that is continuous from the first point 961 to the fourth point 964, a second stroke region 969b that is continuous from the fourth point 964 to the third point 963, and a third stroke region 969c that is continuous from the third point 963 to the second point 962 through the touch screen 960 to correspond to the gesture inputted in the first direction 968 from the first point 961 to the second point 962 via the fourth point 964 and then the third point 963 on the touch screen 960.

According to various embodiments, when displaying the stroke 969 that is continuous from the first point 961 to the second point 962 to correspond to the gesture inputted through the touch screen 960, the processor 120 may receive a delete input of a second size (greater than the first size in FIG. 8) in a counterclockwise direction 971 inputted through a rotation input unit 970 of an external device 902 capable of communicating with the electronic device 900.

According to various embodiments, upon receiving the second-size (greater than the first size in FIG. 8) delete input in a counterclockwise direction 971, the processor 120 may delete at least some regions of the stroke 969, that is, the third stroke region 969c first and then the second stroke region 969b, in the second direction 967 opposite to the first direction 968 in which the stroke 969 is input, from the second point 962 that is at least a part of the stroke 969 displayed on the touch screen 960, based on the second-size (greater than the first size in FIG. 8) delete input in a counterclockwise direction 971.

Figure 10:
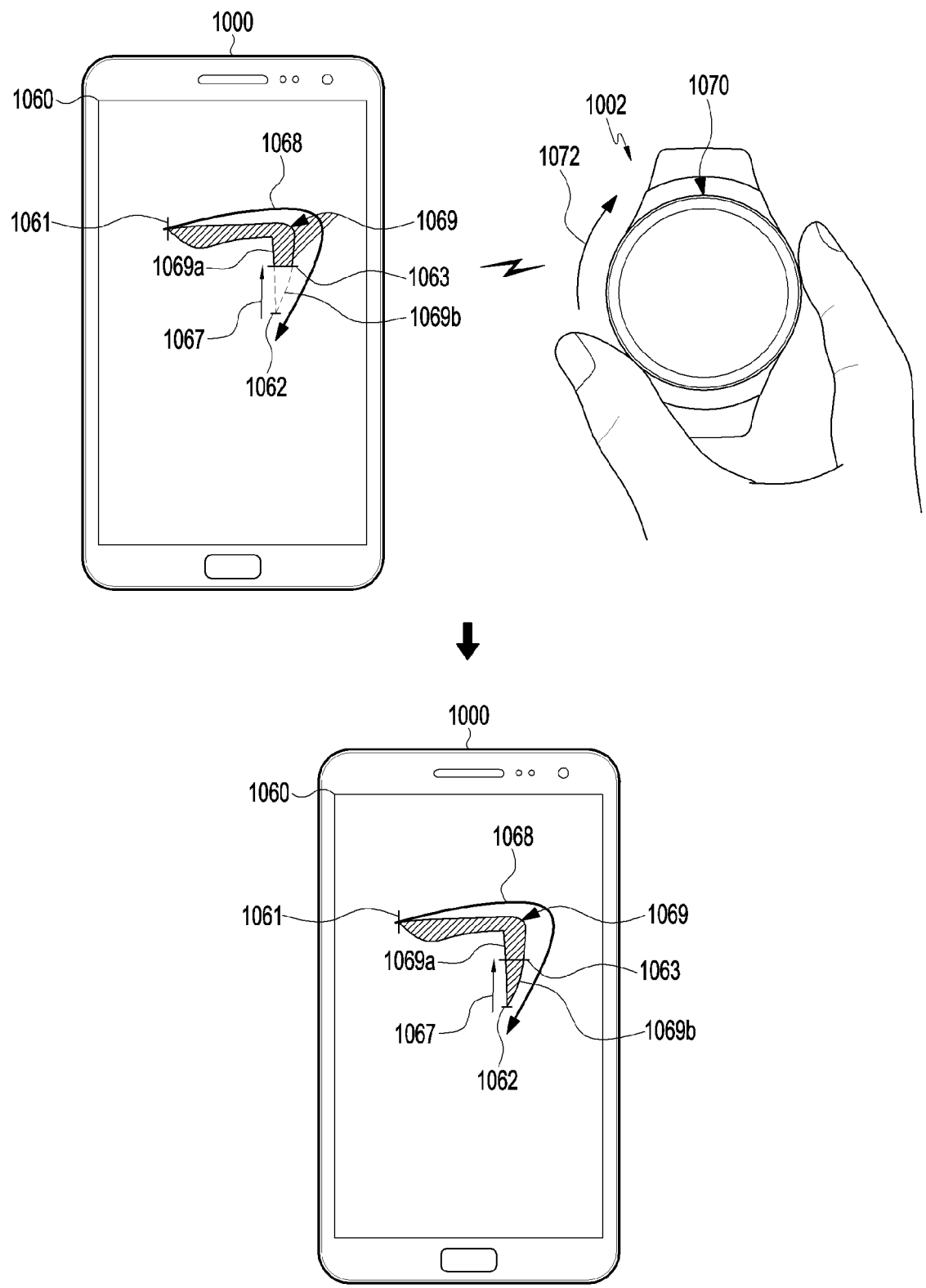
FIG. 10 shows a stroke deletion cancelling method according to various embodiments of the present disclosure.

FIG. 10 shows a stroke deletion canceling method according to various embodiments of the present disclosure.

As shown in FIG. 10, according to various embodiments, when at least a part, for example, a second stroke region 1069b, of some regions 1069a and 1069b of a stroke 1069 that is continuous from a first point 1061 to a second point 1062 in a first direction 1068 is deleted in a second direction 1067 from the second point 1062, a processor (e.g., the processor 120) of an electronic device 1000 may receive a deletion cancel input in a clockwise direction 1072 through an external device 1002 connected with the electronic device 1000.

According to various embodiments, upon receiving the deletion cancel input in a clockwise direction 1072, the processor 120 may cancel the deletion of the deleted second stroke region 1069b to restore the second stroke region 1069b, and display the stroke 1069 including the restored second stroke region 1069b and the first stroke region 1069a among the some regions 1069a and 1069b of the stroke 1069 that is continuous in the first direction 1068 from the first point 1061 to the second point 1062.

Figure 11:
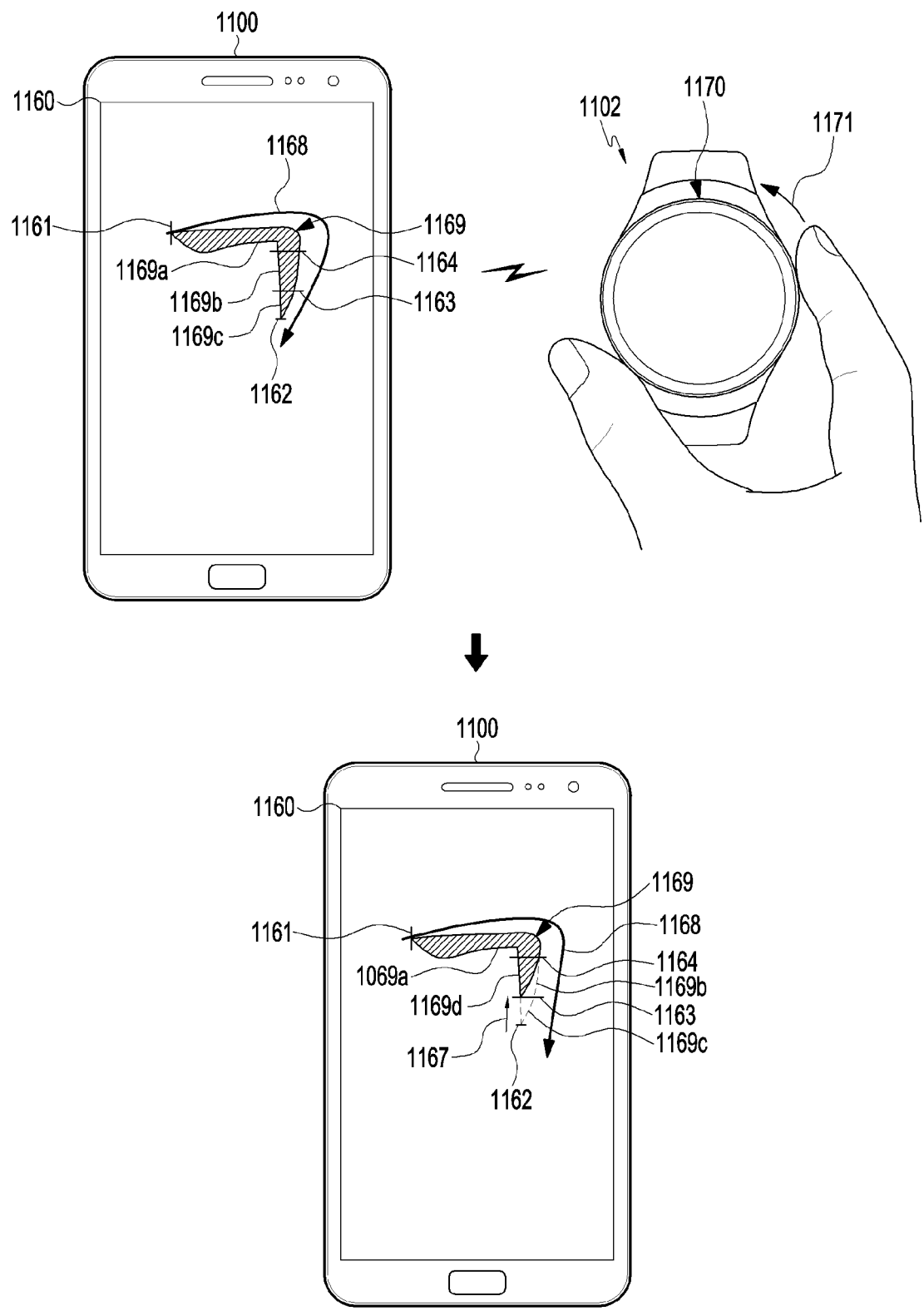
FIG. 11 shows a stroke deleting method according to various embodiments of the present disclosure.

FIG. 11 shows a stroke deleting method according to various embodiments of the present disclosure.

As shown in FIG. 11, according to various embodiments, a processor (e.g., the processor 120) of an electronic device 1100 may receive a gesture inputted in a first direction 1168 from a first point 1161 to a second point 1162 through a touch screen 1160.

According to various embodiments, the processor 120 of the electronic device 1100 may display a stroke 1169 that is continuous from the first point 1161 to the second point 1162, through the touch screen 1160 to correspond to the gesture inputted in the first direction 1168 from the first point 1161 to the second point 1162.

According to various embodiments, the processor 120 of the electronic device 1100 may receive the gesture inputted in the first direction 1168 from the first point 1161 to the second point 1162 via a fourth point 1164 and then a third point 1163 on the touch screen 1160.

According to various embodiments, the processor 120 may display a first stroke region 1169a that is continuous from the first point 1161 to the fourth point 1164, a second stroke region 1169b that is continuous from the fourth point 1164 to the third point 1163, and a third stroke region 1169c that is continuous from the third point 1163 to the second point 1162 through the touch screen 1160 to correspond to the gesture inputted in the first direction 1168 from the first point 1161 to the second point 1162 via the fourth point 1164 and then the third point 1163 on the touch screen 1160.

According to various embodiments, when displaying the stroke 1169 that is continuous from the first point 1161 to the second point 1162 to correspond to the gesture inputted through the touch screen 1160, the processor 120 may receive a delete input inputted through a rotation input unit 1170 of an external device 1102 capable of communicating with the electronic device 1100, and delete the third stroke region 1169c that is at least a part of the stroke 1169 displayed on the touch screen 1160 in a second direction 1167 that is opposite to the first direction 1168 in which the stroke 1169 is input, based on the first-size delete input in a counterclockwise direction 1171.

According to various embodiments, the processor 120 may delete the third stroke region 1169c displayed on the touch screen 1160 based on the delete input in the first direction 1171, change into the shape of the third stroke region 1169c, the shape of the second stroke region 1196b closer to the second point 1162 that is the input end point of the gesture between the first stroke 1169a and the second stroke region 1169b that remain without being deleted, based on the shape of the deleted third stroke region 1169c, and display the shape-changed second stroke region 1196b on the touch screen 1160.

Figure 12:
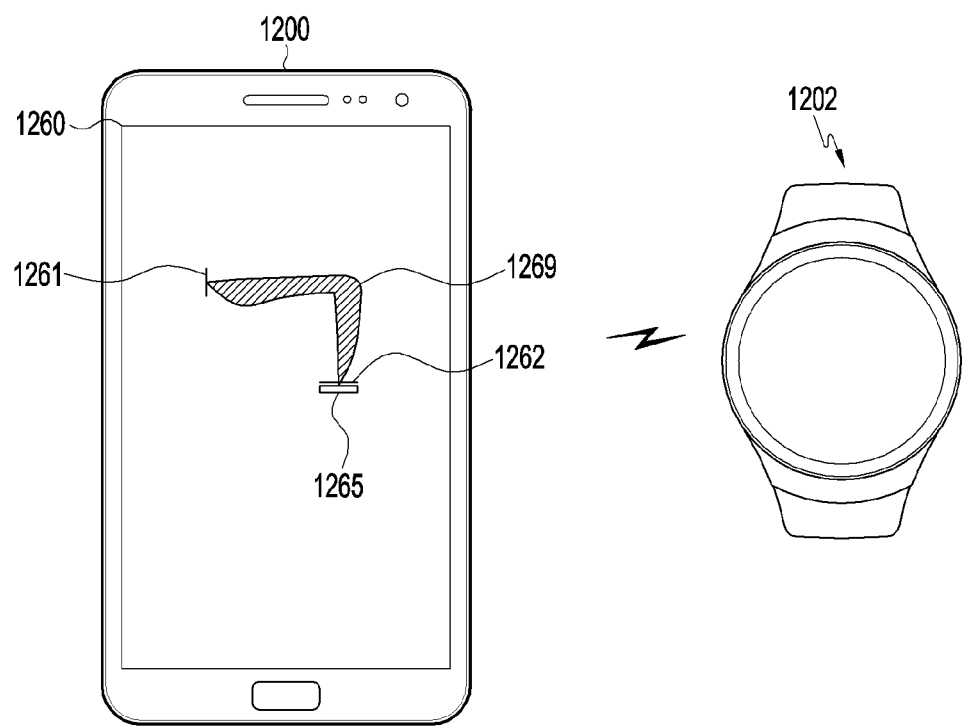
FIG. 12 shows a cursor displaying method according to various embodiments of the present disclosure.

FIG. 12 shows a cursor displaying method according to various embodiments of the present disclosure.

As shown in FIG. 12, according to various embodiments, a processor (e.g., the processor 120) of an electronic device 1200 may display a stroke 1269 that is continuous from a first point 1261 to a second point 1262 through a touch screen 1260.

According to various embodiments, the processor 120 may display the stroke 1269 that is continuous from the first point 1261 to the second point 1262, through the touch screen 1260 and display a cursor 1265 in the second point 1262.

According to various embodiments, the processor 120 may receive a cursor move input inputted through an external device 1202 connected with the electronic device 1200 and continuously move the cursor 1265 along the stroke 1269 between the first point 1261 and the second point 1262, starting from the second point 1262 of the stroke 1269, based on the received cursor move input.

Figure 13:
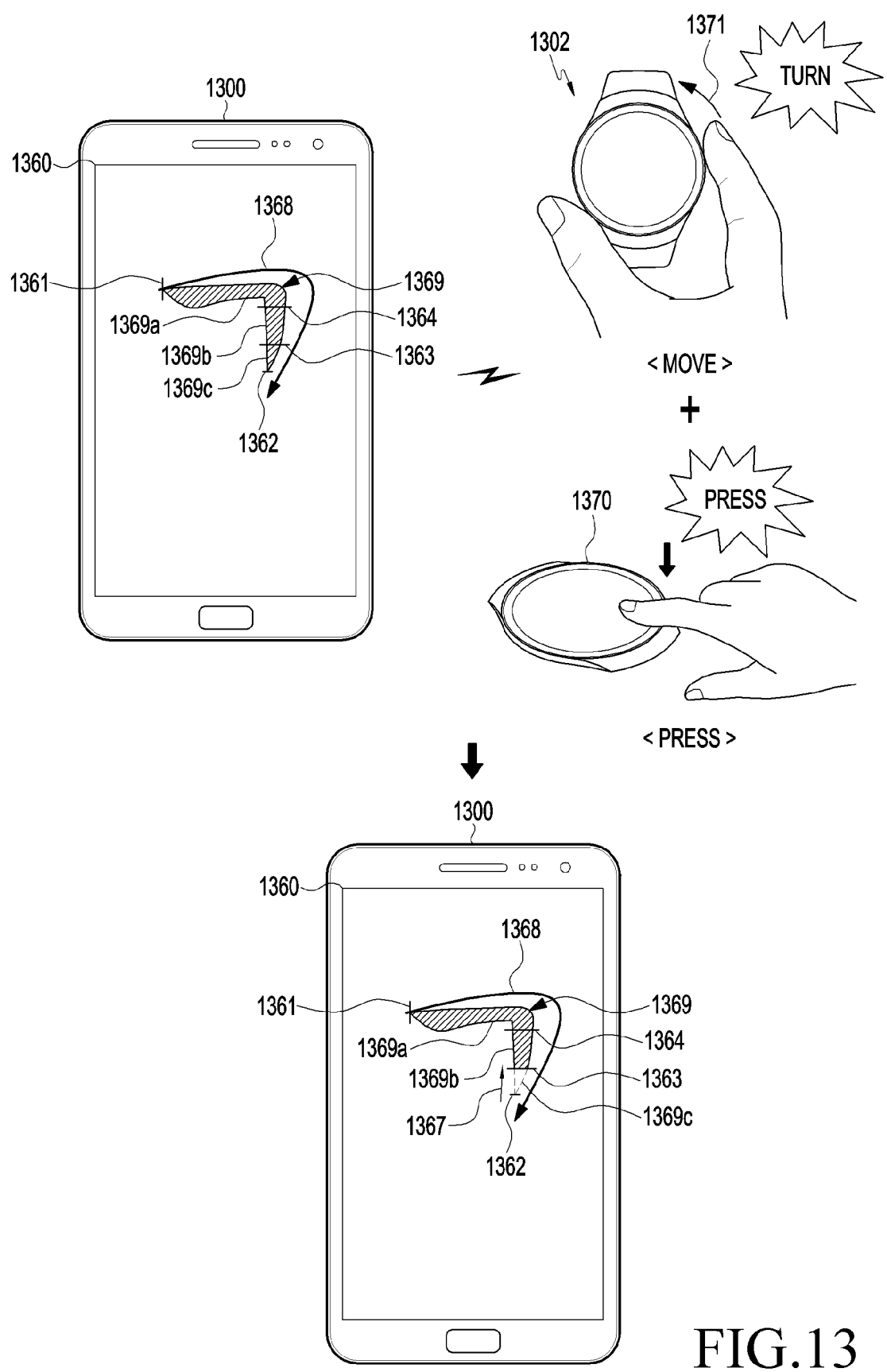
FIG. 13 shows a stroke deleting method according to various embodiments of the present disclosure.

FIG. 13 shows a stroke deleting method according to various embodiments of the present disclosure.

As shown in FIG. 13, according to various embodiments, a processor of an electronic device 1300 (e.g., the processor 120) may receive a gesture inputted through a touch screen 1360 in a first direction 1368 from a first point 1361 to a second point 1362 via a fourth point 1364 and then a third point 1363, and display a first stroke region 1369a that is continuous from the first point 1361 to the fourth point 1364, a second stroke region 1369b that is continuous from the fourth point 1364 to the third point 1363, and a third stroke region 1369c that is continuous from the third point 1363 to the second point 1362 through the touch screen 1360 to correspond to the gesture inputted in the first direction 1368 from the first point 1361 to the second point 1362 via the fourth point 1364 and then the third point 1363 on the touch screen 1360.

According to various embodiments, when displaying the stroke 1368, the processor 120 may receive a first-size cursor move input inputted through a rotation input unit 1370 of an external device 1302 capable of communicating with the electronic device 1300 in a counterclockwise direction 1371 and/or a deletion execute input for applying pressure to the rotation input unit 1370.

According to various embodiments, upon receiving the deletion execute input, the processor 120 may delete the third stroke region 1369c, which is at least a part of the stroke 1369, from the second point 1362 displayed on the touch screen 1360 in a second direction 1367 that is opposite to the first direction 1368 in which the stroke 1369 is input, based on the first-size cursor move input inputted through the rotation input unit 1370 of the external device 1302 in a counterclockwise direction 1371 and/or the deletion execute input for applying pressure to the rotation input unit 1370.

Figure 14:
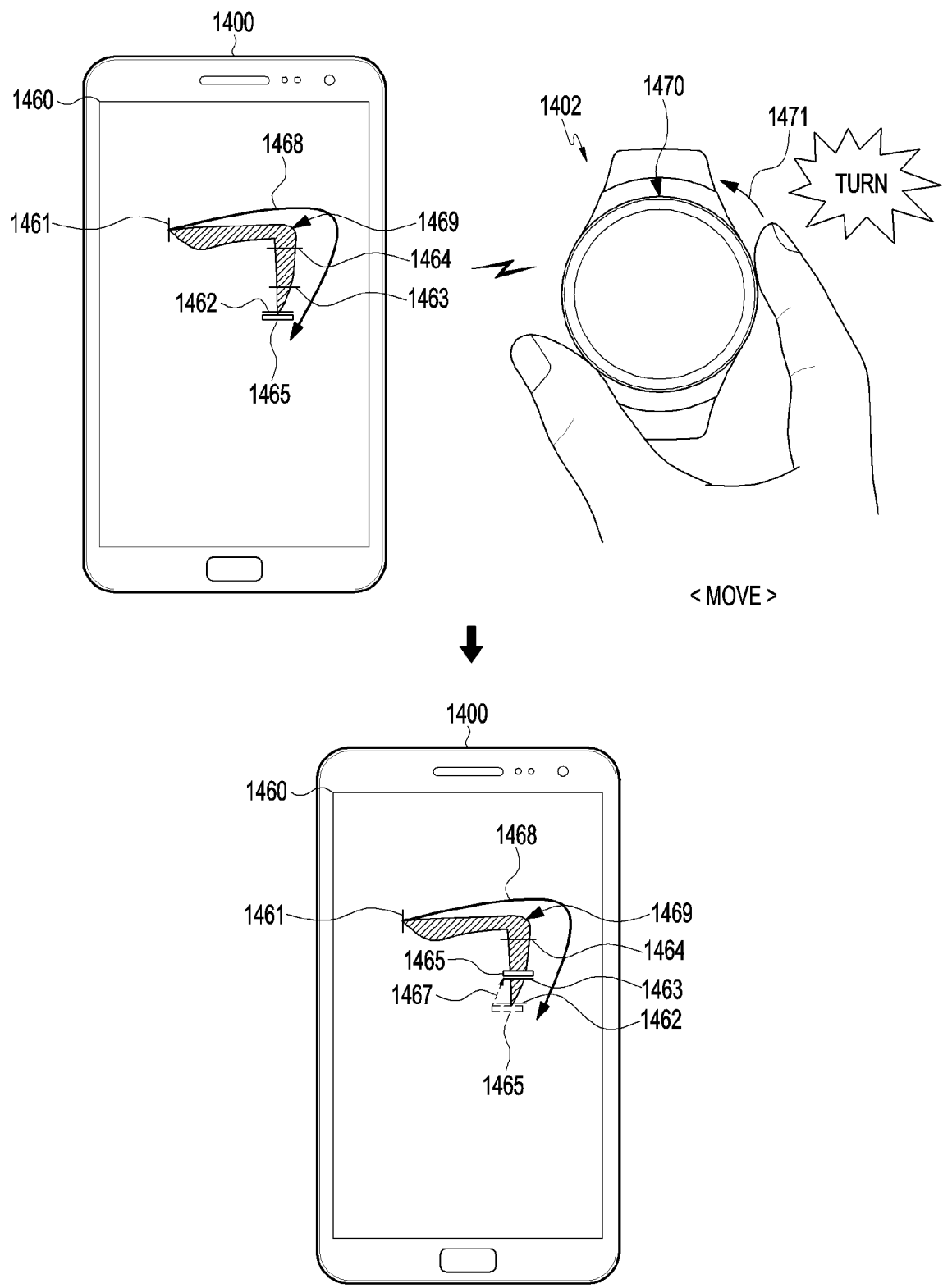
FIG. 14 shows a cursor moving method according to various embodiments of the present disclosure.

FIG. 14 shows a cursor moving method according to various embodiments of the present disclosure.

As shown in FIG. 14, according to various embodiments, a processor (e.g., the processor 120) of an electronic device 1400 may display a stroke 1469 that is continuous from a first point 1461 to a second point 1462 via a fourth point 1464 and then a third point 1463 on a touch screen 1460.

According to various embodiments, the processor 120 may display the stroke 1469 that is continuous from the first point 1461 to the second point 1462 via the fourth point 1464 and then the third point 1463 on the touch screen 1460 and display a cursor 1465 in the second point 1462.

According to various embodiments, the processor 120 may receive the first-size cursor move input inputted in a counterclockwise direction 1471 through a rotation input unit 1470 of an external device 1402 connected with the electronic device 1400, and continuously move the cursor 1465 displayed on the touch screen 1460 to the third point 1463 in a second direction 1467 that is opposite to the first direction 1468 in which the gesture is input along the stroke 1469, starting from the second point 1462 of the stroke 1469, based on a ratio of a preset cursor move input size and a cursor moving length of the cursor 1465 according to a size and a direction (the first-size counterclockwise direction 1471) of the received cursor move input.

Figure 15:
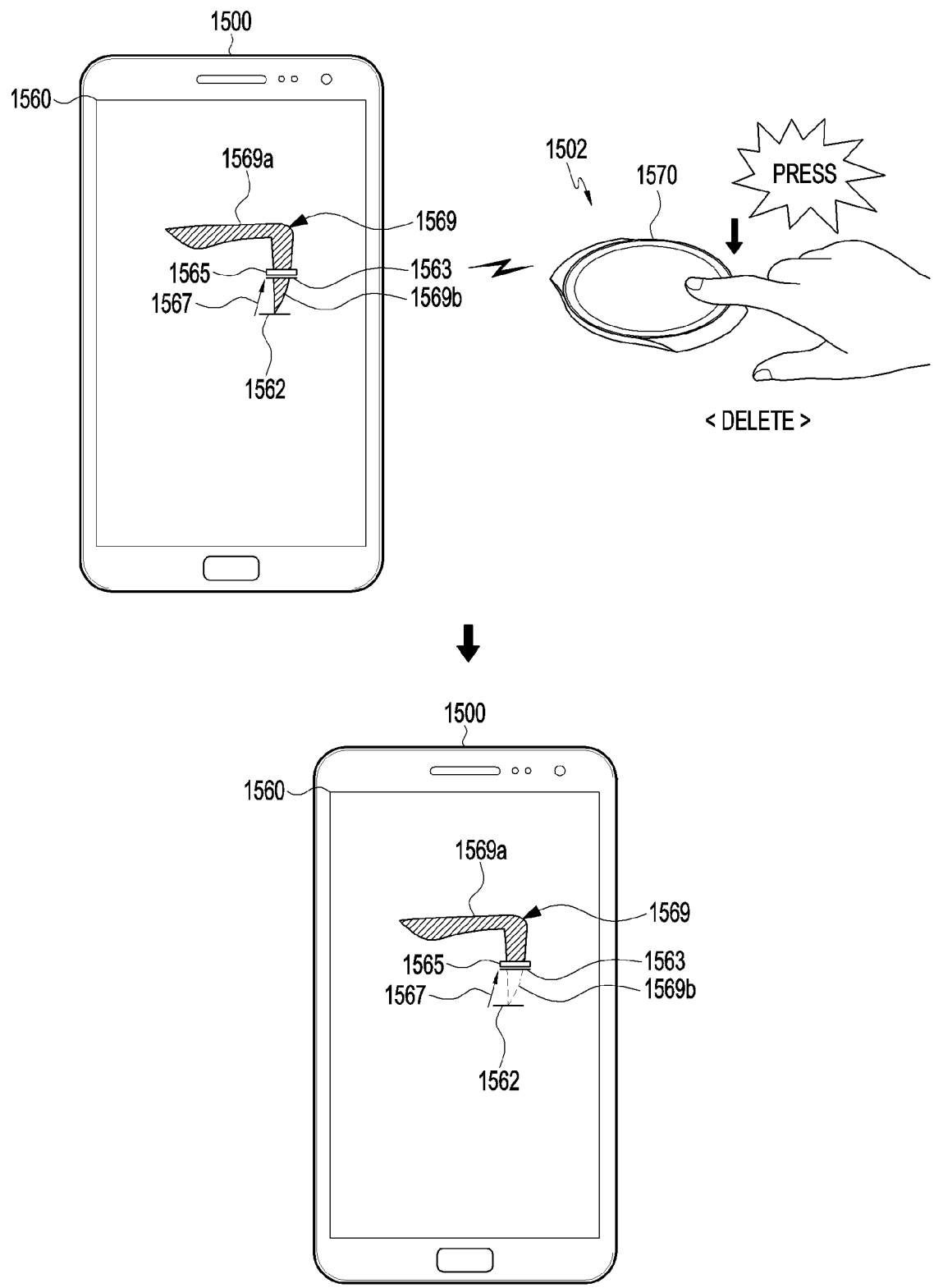
FIG. 15 shows a stroke deleting method according to various embodiments of the present disclosure.

FIG. 15 shows a stroke deleting method according to various embodiments of the present disclosure.

As shown in FIG. 15, according to various embodiments, when displaying a first stroke region 1569a and a second stroke region 1569b of a stroke 1569 through a touch screen 1560, a processor (e.g., the processor 120) of an electronic device 1500 may move a cursor 1565, displayed in a second point 1562, to a third point 1563 in a second direction 1567 along the stroke 1569, based on the cursor move input shown in FIG. 14.

According to various embodiments, the processor 120 may receive a deletion execute input for applying pressure to a rotation input unit 1570 of an external device 1502 connected with the electronic device 1500 when the cursor 1565 is displayed in the third point 1563.

According to various embodiments, the processor 120 may receive the deletion execute input for applying pressure to the rotation input unit 1570 of the external device 1502 connected with the electronic device 1500 when the cursor 1565 is displayed in the third point 1563, and delete a second stroke region 1596b that is a partial stroke region from the second point 1562 corresponding to the input end point of the stroke 1569 to the third point 1563 in which the cursor 1565 is currently positioned, sequentially in the second direction 1567 from the second point 1562, based on the received deletion execute input.

Figure 16:
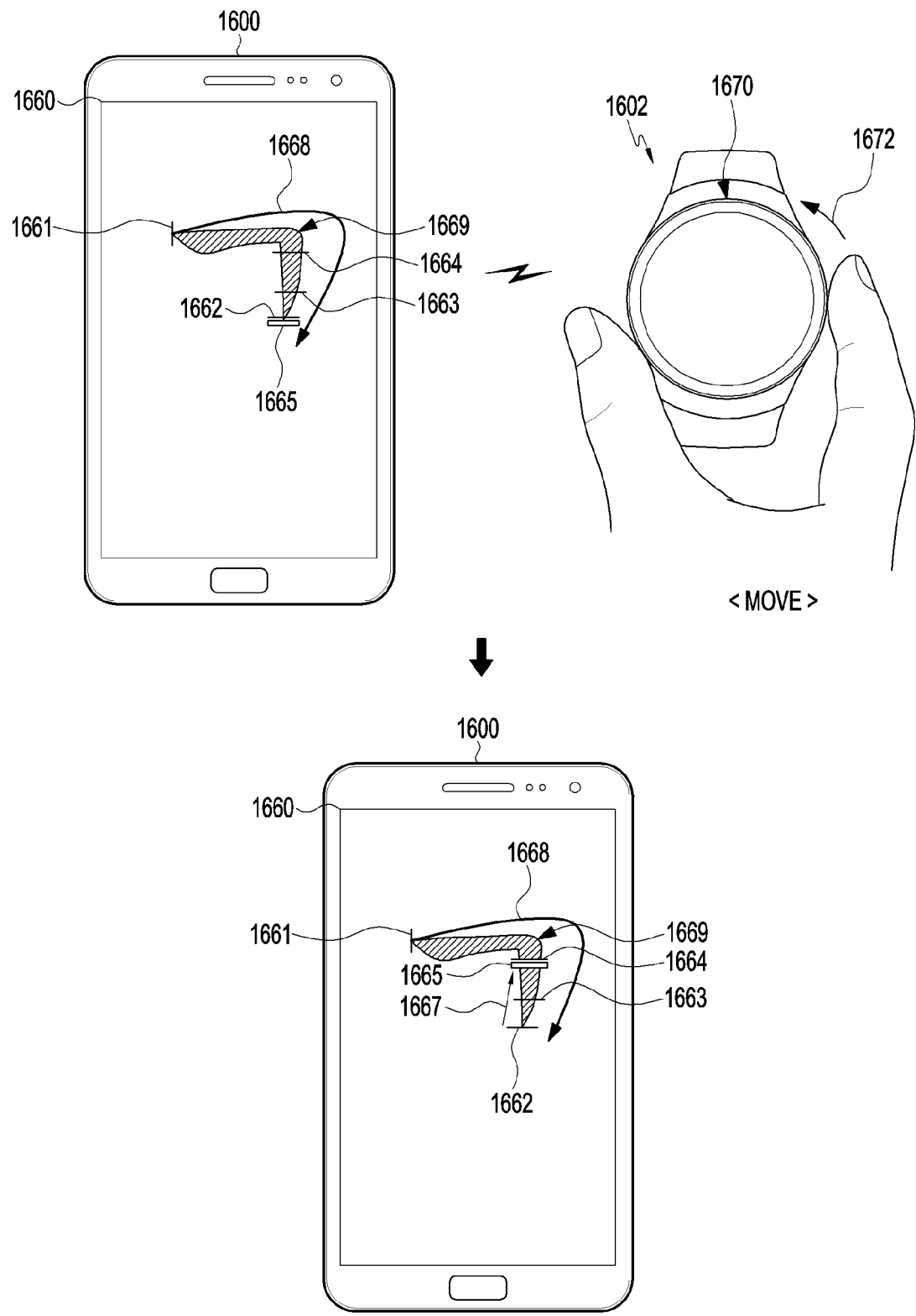
FIG. 16 shows a cursor moving method according to various embodiments of the present disclosure.

FIG. 16 shows a cursor moving method according to various embodiments of the present disclosure.

As shown in FIG. 16, according to various embodiments, a processor (e.g., the processor 120) of an electronic device 1600 may display a stroke 1669 that is continuous from a first point 1661 to a second point 1662 via a fourth point 1664 and then a third point 1663 on a touch screen 1660.

According to various embodiments, the processor 120 may display the stroke 1669 that is continuous from the first point 1661 to the second point 1662 via the fourth point 1664 and then the third point 1663 on the touch screen 1660, and display a cursor 1665 in the second point 1662.

According to various embodiments, the processor 120 may receive a second-size cursor move input inputted in a counterclockwise direction 1671 through a rotation input unit 1670 of an external device 1602 connected with the electronic device 1600, and continuously move the cursor 1665 displayed on the touch screen 1660 to a fourth point 1664 in a second direction 1667 that is opposite to the first direction 1668 in which a gesture is input along the stroke 1669, starting from the second point 1662 of the stroke 1669, based on a ratio of a preset cursor move input size and the cursor moving length of the cursor 1665 according to the size and direction (the second size and a counterclockwise direction 1671) of the received cursor move input.

Figure 17:
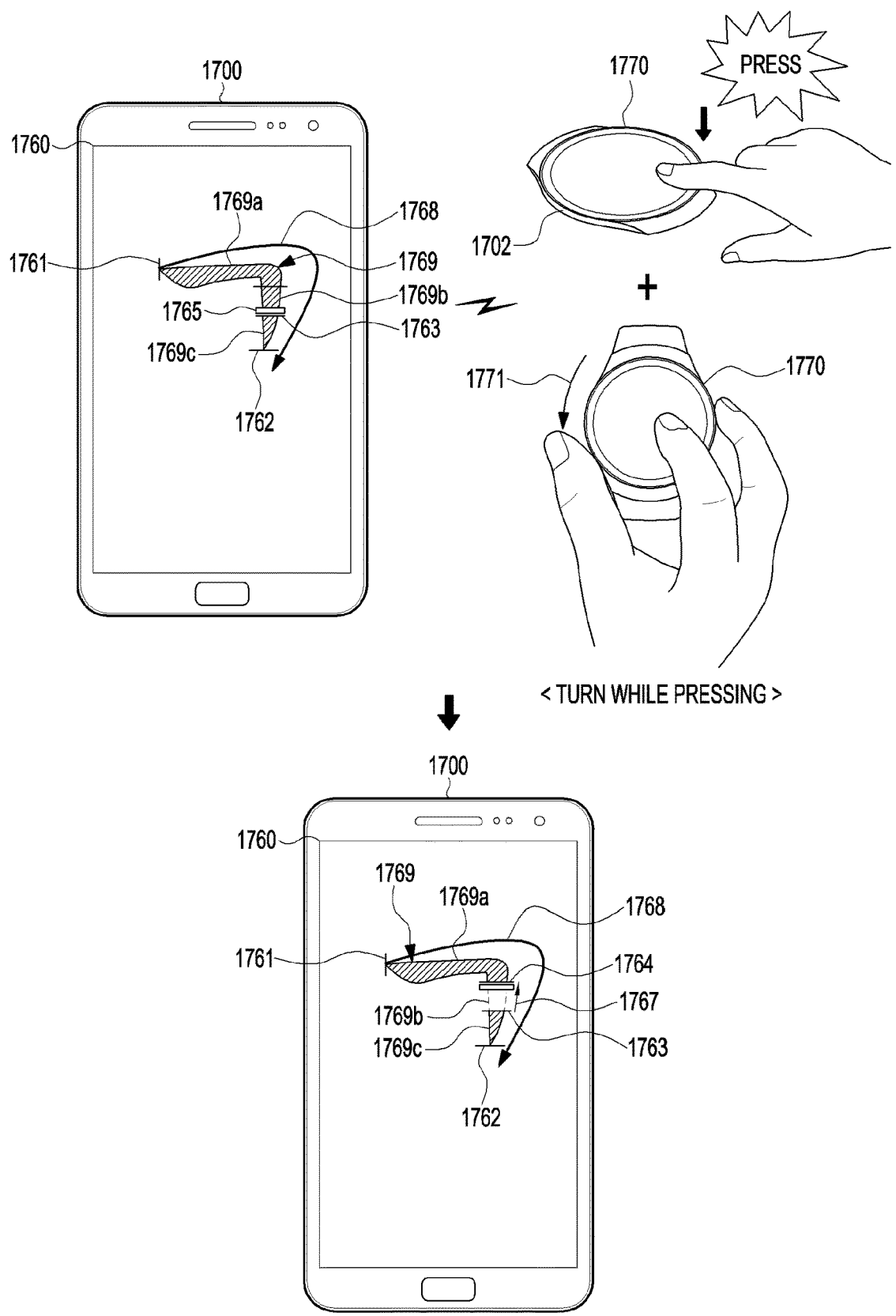
FIG. 17 shows a stroke deleting method according to various embodiments of the present disclosure.

FIG. 17 shows a stroke deleting method according to various embodiments of the present disclosure.

As shown in FIG. 17, according to various embodiments, a processor (e.g., the processor 120) of an electronic device 1700 may display a stroke 1769 that is continuous from a first point 1761 to a second point 1762 via a fourth point 1764 and then a third point 1763 on a touch screen 1760 to correspond to a gesture inputted through the touch screen 1760.

According to various embodiments, the processor 120 may receive a cursor move input of an external device 1702 connected with the electronic device 1700, and move a cursor 1765 displayed in the second point 1762, to the third point 1763 in a second direction 1767 that is opposite to a first direction 1768, based on the received cursor move input.

According to various embodiments, when the cursor 1765 is displayed in the third point 1763, the processor 120 may receive an input for applying pressure to a rotation input unit 1770 of the external device 1702 and a rotation input for rotating, in a counterclockwise direction 1771, the rotation input unit 1770 to which the pressure is applied, and while moving the cursor 1765 from the third point 1763 to the fourth point 1764 in the second direction 1767 to correspond to the rotation input, may delete a second stroke region 1769b from the third point 1763 in which the cursor 1765 was positioned previously, to the fourth point 1764 to which the cursor 1765 is moved in the second direction 1767.

Figure 18:
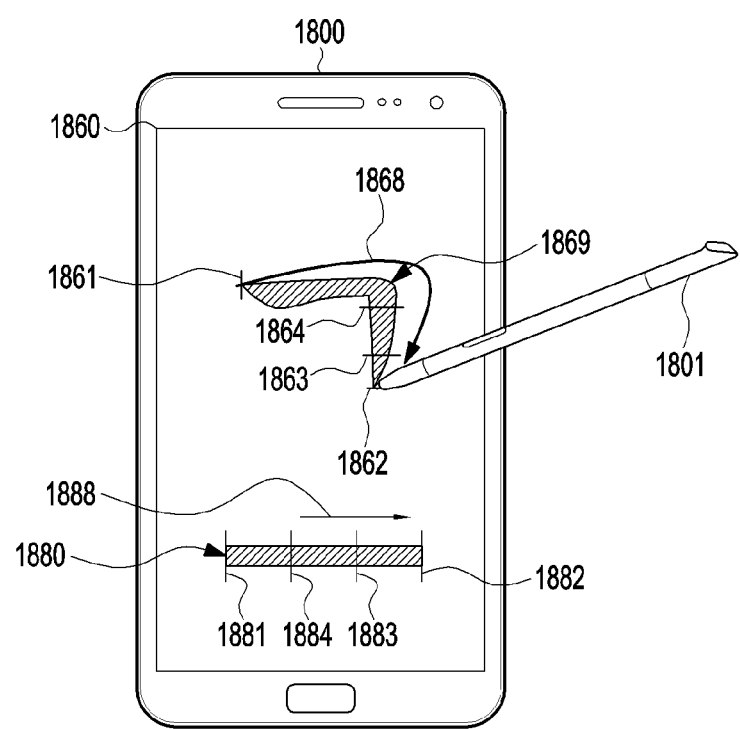
FIG. 18 shows a bar displaying method according to various embodiments of the present disclosure.

FIG. 18 shows a bar displaying method according to various embodiments of the present disclosure.

As shown in FIG. 18, according to various embodiments, to correspond to a gesture inputted through a touch screen 1860, a processor (e.g., the processor 120) of an electronic device 1800 may display a stroke 1869 that is continuous from a first point, 1861 which corresponds to an input start point of the gesture inputted by an electronic device 1801, to a second point, 1801 which corresponds to an input end point of the gesture, via a fourth point 1864 and then a third point 1863 on the touch screen 1860 in a first direction 1868 in which the gesture is input.

According to various embodiments, to correspond to the gesture inputted through the touch screen 1860, the processor 120 may display a rod-shape bar 1880, continuous from a fifth point 1881 to a sixth point 1882 via an eighth point 1884 and then a seventh point 1883, in a third direction 1888 corresponding to the first direction 1868 through the touch screen 1860, while continuously displaying (and/or displays) the stroke 1869 that is continuous from the first point 1861, which corresponds to the input start point of the gesture inputted by the electronic pen 1801, to the second point 1862, which corresponds to the input end point of the gesture, through the touch screen 1860 in the first direction 1868 in which the gesture is input.

According to various embodiments, the processor 120 may display the bar 1880 from the fifth point 1881 to correspond to the first point 1861 while displaying the stroke 1869 from the first point 1861, display the bar 1880 to the sixth point 1882 to correspond to the second point 1862 while displaying the stroke 1869 to the second point 1862, display the bar 1880 to the seventh point 1883 to correspond to the third point 1863 while displaying the stroke 1869 to the third point 1863, and display the bar 1880 to the eighth point 1884 to correspond to the fourth point 1864 while displaying the stroke 1869 to the fourth point 1864.

Figure 19:
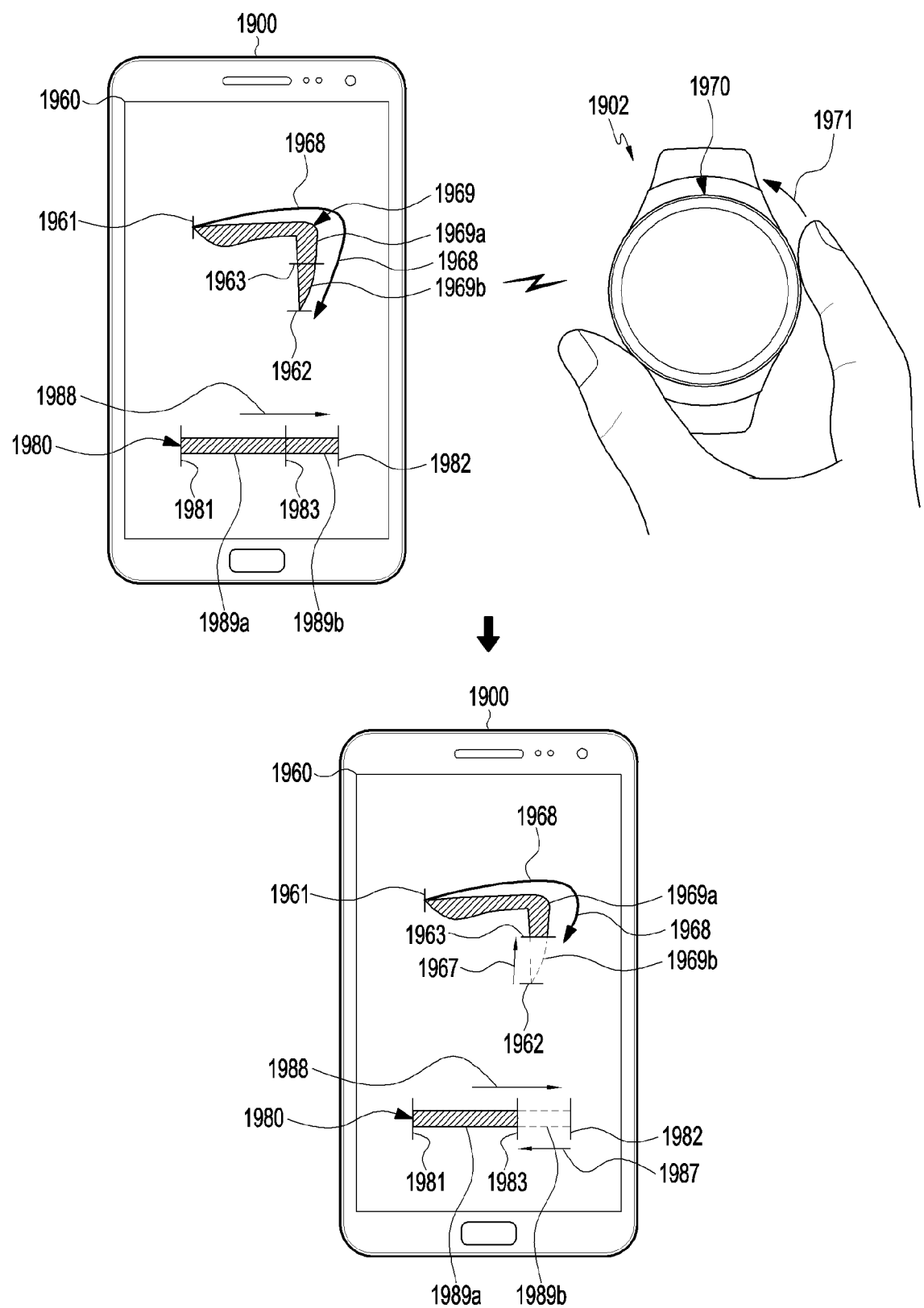
FIG. 19 shows a bar length changing method according to various embodiments of the present disclosure.

FIG. 19 shows a bar length changing method according to various embodiments of the present disclosure.

As shown in FIG. 19, according to various embodiments, to correspond to a gesture inputted in a first direction 1968 through a touch screen 1960, a processor of an electronic device 1900 (e.g., the processor 120) may continuously display a first stroke region 1969a from a first point 1961 to a third point 1963 in a first direction 1968, and while continuously displaying a second stroke region 1969b from the third point 1963 to the second point 1962 in the first direction 1968, may continuously display a rod-shape bar 1980 that is continuous from a fifth point 1981 to a sixth point 1982 via a seventh point 1983 in a third direction 1988 corresponding to the first direction 1968 through the touch screen 1960.

According to various embodiments, the processor 120 may display the bar 1980 from the fifth point 1981 to correspond to the first point 1961 while displaying the stroke 1969 from the first point 1961, displays the bar 1980 to the sixth point 1982 to correspond to the second point 1962 while displaying the stroke 1969 to the second point 1962, and may display the bar 1980 to the seventh point 1883 to correspond to the third point 1963 while displaying the stroke 1969 to the third point 1963.

According to various embodiments, the processor 120 may receive a delete input for rotating a rotation input unit 1970 of an external device 1902 connected with the electronic device 1900 in a counterclockwise direction 1971, when the stroke 1969 and/or the bar 1980 is displayed on the touch screen 1960.

According to various embodiments, to correspond to the received delete input while displaying the stroke 1969 and/or the bar 1980 on the touch screen 1960, the processor 120 may delete a second stroke region 1996b closer to the second point 1962 that is the input end point of the gesture between some regions 1969a and 1969b of the stroke 1969, sequentially from the second point 1962 to the third point 1963 in the second direction 1967 that is opposite to the first direction 1968.

According to various embodiments, to correspond to the received delete input while displaying the stroke 1969 and/or the bar 1980 on the touch screen 1960, the processor 120 may delete a second bar region 1989b closer to the sixth point 1982 corresponding to the second point 1962 between some regions 1989a and 1989b of the bar 1980, sequentially from the sixth point 1982 to the seventh point 1987 in a fourth direction 1987 corresponding to the second direction 1968, while deleting (and/or deletes) the second stroke region 1989b closer to the second point 1962 between some regions 1969a and 1969b of the stroke 1969, sequentially from the second point 1982 to the third point 1963 in the second direction 1987 that is opposite to the first direction 1968.

An electronic device according to various embodiments of the present disclosure may include a touch screen on which a stroke is displayed corresponding to a gesture inputted to the touch screen, and a processor, in which the processor is configured to delete at least a part of the displayed stroke from a first point of the stroke based on a delete input inputted through an external device.

According to various embodiments, the processor may be further configured to display a cursor on the stroke to correspond to the gesture.

According to various embodiments, the processor may be further configured to move the cursor on the stroke to correspond to a cursor move input inputted through the external device.

According to various embodiments, the processor is further configured to delete at least a part of the displayed stroke based on a position of the cursor on the stroke to correspond to a cursor execute input inputted through the external device.

According to various embodiments, the processor may be further configured to delete a stroke region between the position of the cursor and the first point among regions of the stroke to correspond to the deletion execute input.

According to various embodiments, the processor may be further configured to delete at least a part of the displayed stroke in a direction opposite to an input direction of the gesture from the first point of the stroke.

According to various embodiments, the processor may be further configured to delete at least a part of the displayed stroke from the first point of the stroke based on a side of the delete input.

According to various embodiments, the processor may be further configured to delete a region of the stroke from the first point to the second point among at least some region of the displayed stroke based on a delete input inputted in a first direction through the external device and to display the region of the stroke from the first point to the second point, deleted based on the delete input in the first direction, based on a deletion cancel input inputted in a second direction through the external device.

According to various embodiments, the processor may be further configured to delete from the first point of the stroke to the second point of the stroke based on the delete input, and to display the stroke from the second point, based on a shape of the stroke to the first point, displayed before being deleted based on the delete input.

According to various embodiments, the processor may be further configured to further display a graph corresponding to the stroke on the touch screen to correspond to the gesture.

A method for controlling an electronic device according to various embodiments of the present disclosure may include receiving a gesture, displaying a stroke to correspond to the received gesture, receiving a delete input, and deleting at least a part of the displayed stroke from a first point of the stroke based on the delete input.

According to various embodiments, the method may further include displaying a cursor on the stroke to correspond to the gesture.

According to various embodiments, the method may further include receiving a cursor move input and moving the cursor on the stroke to correspond to the received cursor move input.

According to various embodiments, the method may further include receiving a deletion execute input and deleting at least a part of the displayed stroke based on a position of the cursor on the stroke to correspond to the received deletion execute input.

According to various embodiments, the method may further include deleting a stroke region between the position of the cursor and the first point among regions of the stroke to correspond to the received deletion execute input.

According to various embodiments, the method may further include deleting at least a part of the displayed stroke in a direction opposite to an input direction of the gesture from a first point of the stroke.

According to various embodiments, the method may further include deleting at least a part of the displayed stroke from a first point of the stroke based on a size of the received delete input.

According to various embodiments, the method may further include receiving a delete input in a first direction, deleting a region from the first point to the second point among at least some region of the displayed stroke based on the received delete input, receiving a deletion cancel input in a second direction, and displaying the region of the stroke from the first point to the second point, deleted based on the delete input in the first direction, based on the received deletion cancel input in the second direction.

According to various embodiments, the method may further include deleting the stroke from the first point to the second point based on the delete input, and displaying the stroke from the second point based on a shape of the stroke to the first point, displayed previously to deletion based on the delete input.

According to various embodiments, the method may further include displaying a graph corresponding to the stroke to correspond to the gesture.

What is claims is:

1. An electronic device comprising:
   communication circuitry;
   a touch screen; and
   a processor configured to:
      receive a gesture input through the touch screen;
      control the touch screen to display a continuous stroke from a first point corresponding to an input start point of the gesture input to a second point corresponding to an input end point of the gesture input different from the input start point;
      receive a cursor move input from an external electronic device through the communication circuitry;
      move a cursor onto the continuous stroke displayed on the touch screen based on the received cursor move input;
      receive a delete input from the external electronic device through the communication circuitry; and
      in response to the received delete input, delete at least a part of the continuous stroke displayed on the touch screen based on a position of the cursor on the continuous stroke.

2. The electronic device of claim 1, wherein the processor is configured to delete a region of the continuous stroke between the position of the cursor and the second point, among regions of the continuous stroke displayed on the touch screen.

3. The electronic device of claim 1, wherein the processor is configured to delete the at least the part of the continuous stroke displayed on the touch screen in a direction opposite to an input direction of the gesture input.

4. The electronic device of claim 1, wherein the processor is configured to delete the at least the part of the continuous stroke displayed on the touch screen based on a magnitude associated with the delete input.

5. The electronic device of claim 1, wherein the processor is configured to:
   delete the at least a part of the continuous stroke displayed on the touch screen based on a first direction associated with the delete input; and
   control the touch screen to re-display the at least a part of the continuous stroke deleted based on the delete input, based on a deletion cancel input received from the external electronic device through the communication circuitry and having a second direction different from the first direction associated therewith.

6. The electronic device of claim 1, wherein the processor is configured to:
   control the touch screen to display a remaining part of the continuous stroke based on a shape of the continuous stroke to the second point, displayed before being deleted based on the delete input.

7. The electronic device of claim 1, wherein the processor is configured to control the touch screen to display a graph corresponding to the continuous stroke.

8. A method for controlling an electronic device, the method comprising:
   receiving a gesture input through a touch screen of the electronic device;
   displaying, on the touch screen, a continuous stroke from a first point corresponding to an input start point of the gesture input to a second point corresponding to an input end point of the gesture input different from the input start point;
   receiving a cursor move input from an external electronic device through communication circuitry;
   moving a cursor onto the continuous stroke displayed on the touch screen based on the received cursor move input;
   receiving a delete input from the external electronic device through communication circuitry; and
   in response to the received delete input, deleting at least a part of the continuous stroke displayed on the touch screen based on a position of the cursor on the continuous stroke.

9. The method of claim 8, wherein the deleting of the at least the part of the continuous stroke displayed on the touch screen comprises deleting a region of the continuous stroke between the position of the cursor and the second point, among regions of the continuous stroke displayed on the touch screen.

10. The method of claim 8, wherein the deleting of the at least the part of the continuous stroke displayed on the touch screen comprises deleting the at least the part of the continuous stroke displayed on the touch screen in a direction opposite to an input direction of the gesture input.

11. The method of claim 8, wherein the deleting of the at least the part of the continuous stroke displayed on the touch screen is based on a magnitude associated with the delete input.

12. The method of claim 8, further comprising:
   deleting the at least a part of the continuous stroke displayed on the touch screen based on a first direction associated with the delete input; and re-displaying, on the touch screen, the at least a part of the continuous stroke deleted based on the delete input, based on a deletion cancel input received from the external electronic device through the communication circuitry and having a second direction different from the first direction associated therewith.

13. The method of claim 8, further comprising:
displaying, on the touch screen, a remaining part of the continuous stroke based on a shape of the continuous stroke to the second point, displayed before being deleted based on the delete input.

14. A non-transitory computer-readable recording medium having recorded thereon a program which, when executed by at least one processor of an electronic device, causes the at least one processor to control the electronic device to perform operations comprising:
receiving a gesture input through a touch screen of the electronic device;
displaying, on the touch screen, a continuous stroke from a first point corresponding to an input start point of the gesture input to a second point corresponding to an input end point of the gesture input different from the input start point;
receiving a cursor move input from an external electronic device through communication circuitry;
moving a cursor onto the continuous stroke displayed on the touch screen based on the received cursor move input;
receiving a delete input from the external electronic device through communication circuitry; and
in response to the received delete input, deleting at least a part of the continuous stroke displayed on the touch screen based on a position of the cursor on the continuous stroke.

* * * * *